US012153880B2

(12) United States Patent
Guberman et al.

(10) Patent No.: US 12,153,880 B2
(45) Date of Patent: Nov. 26, 2024

(54) METHODS AND SYSTEMS FOR INTELLIGENT EDITING OF LEGAL DOCUMENTS

(71) Applicant: BriefCatch LLC, Arlington, VA (US)

(72) Inventors: Ross Guberman, Arlington, VA (US); Thai Doan, Farmington, MA (US)

(*) Notice: Subject to any disclaimer, the term of this patent is extended or adjusted under 35 U.S.C. 154(b) by 375 days.

(21) Appl. No.: 17/743,801

(22) Filed: May 13, 2022

(65) Prior Publication Data

US 2023/0123574 A1   Apr. 20, 2023

Related U.S. Application Data

(63) Continuation-in-part of application No. 17/503,442, filed on Oct. 18, 2021, now Pat. No. 11,361,151.

(51) Int. Cl.
| | |
|---|---|
| *G06F 40/253* | (2020.01) |
| *G06F 40/166* | (2020.01) |
| *G06N 20/20* | (2019.01) |
| *G06Q 50/18* | (2012.01) |

(52) U.S. Cl.
CPC .......... *G06F 40/253* (2020.01); *G06F 40/166* (2020.01); *G06N 20/20* (2019.01); *G06Q 50/18* (2013.01)

(58) Field of Classification Search
CPC ...... G06F 40/253; G06F 40/166; G06F 40/30; G06N 20/20; G06N 3/084; G06N 20/00; G06N 3/045; G06N 7/01; G06Q 50/18; G06Q 10/10
USPC .......................................................... 704/9
See application file for complete search history.

(56) References Cited

U.S. PATENT DOCUMENTS

| | | |
|---|---|---|
| 8,587,613 B2 | 11/2013 | Wang et al. |
| 9,678,949 B2 | 6/2017 | Monk, II et al. |
| 9,811,518 B2 | 11/2017 | Leidner et al. |
| 10,713,436 B2 | 7/2020 | Herr et al. |
| 10,878,233 B2 | 12/2020 | Bender et al. |
| 10,936,672 B2 | 3/2021 | Boyce et al. |
| 10,936,805 B2 | 3/2021 | De Mello Brandao et al. |
| 2016/0055196 A1 | 2/2016 | Collins et al. |
| 2020/0327172 A1 | 10/2020 | Coquard et al. |

(Continued)

FOREIGN PATENT DOCUMENTS

WO    2020050812    3/2020

OTHER PUBLICATIONS

LAWVU, Knowledge & document management for in-house legal counsel., Dec. 31, 2015.

*Primary Examiner* — Thierry L Pham
(74) *Attorney, Agent, or Firm* — Caldwell Intellectual Property Law

(57) ABSTRACT

A system for intelligent editing of legal documents. The system includes a computing device. The computing device is configured to access a plurality of legal source texts from a plurality of legal sources, generate a score for each of the plurality of legal source texts, train a natural language processing model as a function of the scored legal source texts and a first machine-learning process, receive user inputted legal text from a user device being operated by a human user to create a user legal document, analyze the user inputted legal text using the natural language processing model, suggest, as a function of the analyzing, a modification to a target text of the user inputted legal text, and generate a score for a modified user legal document. A method for intelligent editing of legal documents is also provided.

20 Claims, 6 Drawing Sheets

(56) References Cited

U.S. PATENT DOCUMENTS

| | | |
|---|---|---|
| 2020/0380061 A1 | 12/2020 | Saar et al. |
| 2020/0394734 A1 | 12/2020 | Moriarty et al. |
| 2021/0081613 A1 | 3/2021 | Begun et al. |
| 2021/0149980 A1 | 5/2021 | Pavlini et al. |

METHODS AND SYSTEMS FOR INTELLIGENT EDITING OF LEGAL DOCUMENTS

CROSS-REFERENCE TO RELATED APPLICATIONS

This application is a continuation-in-part of Non-provisional application Ser. No. 17/503,442, filed on Oct. 18, 2021, and entitled "METHODS AND SYSTEMS FOR INTELLIGENT EDITING OF LEGAL DOCUMENTS," the entirety of which is incorporated herein by reference.

FIELD OF THE INVENTION

The present invention generally relates to the field of document editing. In particular, the present invention is directed to methods and systems for intelligent editing of legal documents.

BACKGROUND

Autonomous editing of documents prepared by users can be useful in a number of circumstances. However, accurately and efficiently implementing such editing can involve complexities which can pose challenges.

SUMMARY OF THE DISCLOSURE

In an aspect an apparatus for intelligent editing of legal documents is provided. The apparatus includes a processor and a memory communicatively connected to the processor. The memory contains instructions configuring the processor to access a plurality of legal source texts from a plurality of legal sources, generate a score for each of the plurality of legal source texts, and train a plurality of natural language processing models as a function of the plurality of scored legal source texts and a first machine-learning process. A first natural language processing model of the plurality of natural language processing models is trained by a first group of the plurality of scored legal source texts, and a second natural language processing model of the plurality of natural language processing models is trained by a second group of the plurality of scored legal source texts. The apparatus is configured to receive user inputted legal text from a user device being operated by a human user to create a user legal document, analyze the user inputted legal text using the plurality of natural language processing models, and suggest, as a function of the analyzing, a modification to a target text of the user inputted legal text. Suggesting the modification to the target text includes outputting a suggested modification to the user inputted legal text to the user device.

In another aspect a method for intelligent editing of legal documents is provided. The method includes accessing a plurality of legal source texts from a plurality of legal sources, generating a score for each of the plurality of legal source texts, and training a plurality of natural language processing models as a function of the plurality of scored legal source texts and a first machine-learning process. A first natural language processing model of the plurality of natural language processing models is trained by a first group of the plurality of scored legal source texts, and a second natural language processing model of the plurality of natural language processing models is trained by a second group of the plurality of scored legal source texts. The method further includes receiving user inputted legal text from a user device being operated by a human user to create a user legal document, analyzing, the user inputted legal text using the plurality of natural language processing models, and suggesting, as a function of the analyzing, a modification to a target text of the user inputted legal text, wherein suggesting the modification to the target text further includes outputting a suggested modification to the user inputted legal text to the user device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for intelligent editing of legal documents. In an embodiment, a natural language processing model analyzes user inputted legal text and suggests one or more modifications to the text. Aspects of the present disclosure can advantageously be used to efficiently and efficaciously to provide real-time suggestions to a user creating a legal document. Aspects of the present disclosure can desirably also be used to provide a reliable proofreading tool for a user creating a legal document. This is so at least in part because a natural language processing model is trained as a function of scores generated for a corpus of documents accessed from multiple legal sources. Aspects of the present disclosure can advantageously also allow for reducing ambiguity and bias in documents being created by a user. Exemplary embodiments illustrating aspects of the present disclosure are described below in the context of several specific examples.

Figure 1:
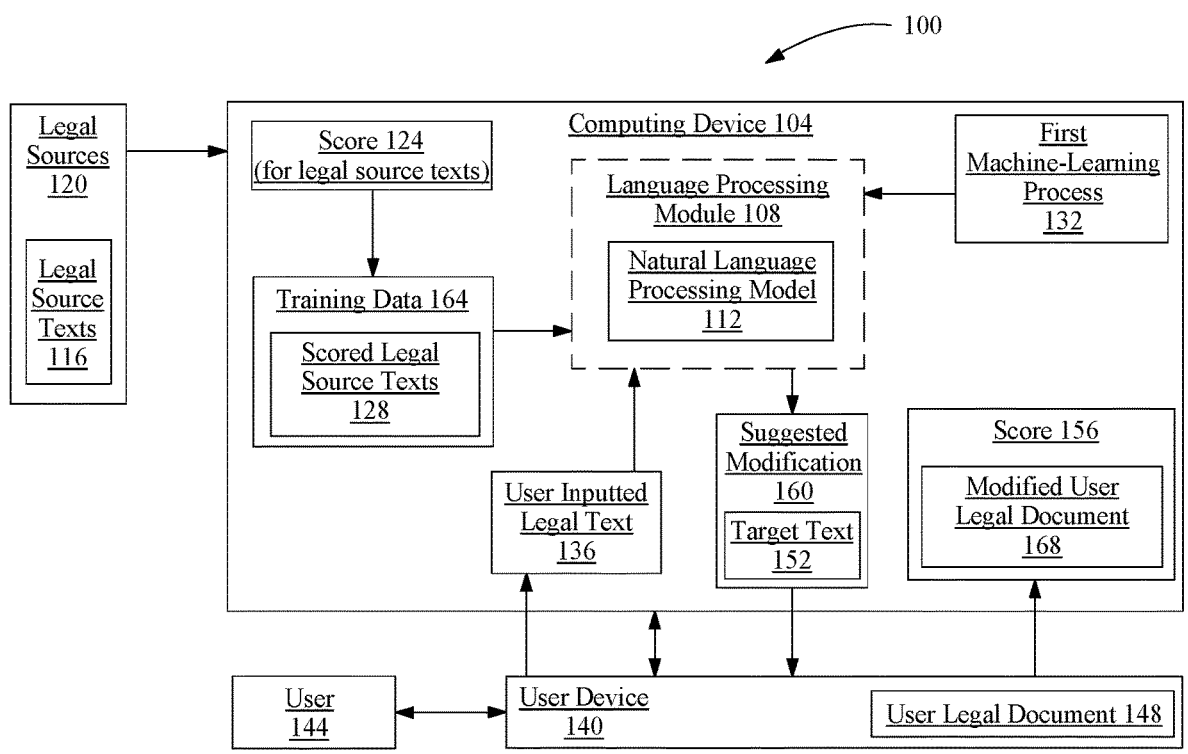
FIG. 1 is a block diagram of an exemplary embodiment of a system for intelligent editing of legal documents.

Referring now to FIG. 1, an exemplary embodiment of a system 100 for intelligent editing of legal documents is illustrated. System 100 may also be referred to as a system for intelligent proofreading of legal documents. System 100 includes at least a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Computing device 104 may include an apparatus comprising at least a processor and a memory, such as memory 608 shown in FIG. 6, communicatively connected to processor. Memory may contain instructions configuring processor to perform any steps and/or functions described in this disclosure.

Still referring to FIG. 1, computing device 104 may perform determinations, classification, and/or analysis steps, methods, processes, or the like as described in this disclosure using machine-learning processes. As discussed further below, a "machine-learning process," as used in this disclosure, is a process that automatedly uses a body of data known as "training data" and/or a "training set" to generate an algorithm that will be performed by a computing device/module to produce outputs given data provided as inputs. As also discussed further below, "training data," as used in this disclosure, is data containing correlations that a machine-learning process may use to model relationships between two or more categories of data elements.

With continued reference to FIG. 1, machine-learning processes as described in this disclosure may be used to generate machine-learning models. As discussed further below, as used in this disclosure, a "machine-learning model" is a mathematical representation of a relationship between inputs and outputs, as generated using any machine-learning process including without limitation any process as described herein, and stored in memory; an input is submitted to a machine-learning model once created, which generates an output based on the relationship that was derived. For instance, and without limitation, a linear regression model, generated using a linear regression algorithm, may compute a linear combination of input data using coefficients derived during machine-learning processes to calculate an output datum. In some embodiments, a machine-learning model (or artificial intelligence model)

may include a natural language processing model. In an embodiment, natural language processing model may include neural networks or neural net algorithms, including convolutional neural networks or convolutional neural net processes.

Still referring to FIG. 1, in some embodiments, computing device 104 may include a language processing module 108 (or natural language processing module). Language processing module 108 may include any hardware and/or software module. Language processing module 108 may be configured to extract, from one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described in the present disclosure. Textual data may be parsed into tokens, which may include a simple word (sequence of letters separated by whitespace) or more generally a sequence of characters as described previously. The term "token," as used in the present disclosure, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module 108 may operate to produce a language processing model such as, in one embodiment, natural language processing (NLP) model 112. Language processing model may include a program automatically generated by computing device 104 and/or language processing module 108 to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, language processing module 108 may generate language processing model by any suitable method, including without limitation a natural language processing classification algorithm; language processing model may include a natural language processing classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMIs, as used in the present disclosure, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module 108 may combine two or more approaches. For instance, and without limitation, machine-learning program (and/or language processing program) may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model (and/or natural language processing model 112) may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element, as described above and herein, may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment, associating language elements to one another, as described above and herein, may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module 108 may use a corpus of documents (e.g. legal source texts from legal sources) to generate associations between language elements in a language processing module, and the module (and/or a language processing model) may then use such associations to analyze words extracted from one or more documents and determine that the one or more documents indicate significance of a category. In an embodiment, language processing module 108 and/or computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, language processing module may automatically obtain the document using such an identifier, for instance by submitting a request to a database or compendium of documents such as JSTOR as provided by Ithaka Harbors, Inc. of New York.

Still referring to FIG. 1, in some embodiments, computing device 104 is configured to access a plurality of legal source texts 116 from a plurality of legal sources 120, generate a score 124 for each of the plurality of legal source texts 116, train natural language processing model 112 as a function of the scored legal source texts 128 and a first machine-learning process 132, receive user inputted legal text 136 from a user device 140 being operated by a human user 144 to create a user legal document 148, analyze user inputted legal text 136 using natural language processing model 112, suggest, as a function of analyzing, a modification to a target text 152 of user inputted legal text 136, and generate a score 156 for a modified user legal document 168. Suggesting modification to target text 152 further includes classifying user legal document 148 into a document type classification, identifying target text 152 of user inputted legal text 136 as a function of the document type classification, and outputting a suggested modification 160 to user inputted legal text 136 to user device 140.

Still referring to FIG. 1, in some embodiments, computing device 104 is configured to access legal source texts 116 from legal sources 120. Legal source text 116 may be accessed from a corpus which may include one or more structured sets of machine-readable texts. In some cases, corpus may also include speech data. As used in this disclosure, a "legal source text" is a document (or part of a document) directed to legal issues or subject matter. Legal source texts 116 may include, for example and without limitation, legal motion, briefs, opinions, decisions, judgements, books, research papers, journal articles, case summaries, and the like, among others. Legal sources 120 may include, for example and without limitation, Wikipedia, Twitter, Pacer Monitor, websites including court websites, and the like, among others.

Still referring to FIG. 1, legal sources 120 may be categorized into different categories or groups. For example, and without limitation, legal sources may be categorized as constitutions, statutes, cases, regulations, and the like, among others. Legal sources may also be grouped according to types. For example, and without limitation, legal sources may be grouped according to primary and secondary types, wherein primary legal sources may include statutes, statutory instruments and law reports and secondary legal sources may include materials that discuss and comment on the law and may include textbooks, legal dictionaries, encyclopedias and journal articles, among others. Legal sources may also be categorized or grouped by author(s) such as, and without limitation, types of institutions or persons. For example, and without limitation, legal sources may be categorized or grouped according to academic institutions, legal institutions, government agencies, professors, lawyers, judges, and the like, among others. Legal sources may also be categorized or grouped based on document type, for example and without limitation, documents which contain laws, court decisions, information about laws, legal forms, examples of briefs, and the like, among others, may be categorized separately.

Still referring to FIG. 1, in some embodiments, computing device 104 is configured to generate score 124 for each of the accessed legal source texts 116. Score 124 may include, for example, a numerical value, a range, a ranking, a grade, a categorization, a classification, and the like, among others. A document type classifier may be used to classify legal source texts 116 according to their document type, and score 124 may be generated for legal source texts falling within each document type classification. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Computing device 104 and/or another device may generate a classifier using a classification algorithm, defined as a processes whereby a computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

Continuing to refer to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values. Document classifier may classify documents to one or more types and/or category of legal source and/or document, which may include any type of legal source, sub-categories and/or more specific categories, or the like. For instance, document classifier may identify a document type as a brief to be presented at a court, and/or may further classify according to type of court such as an administrative court, a district or trial court, an appellate court, an appellate court of last resort, or the like, type of brief such as summary judgment brief, reply brief, appellate brief, or the like, and/or a party position of an author of the brief such as a plaintiff, defendant, appellant, appellee, petitioner, or the like. Document classifier may be trained using training data correlating legal sources to labeled document types. In an embodiment, document classifier may be able to determine what document type a partially completed legal document belongs to.

Further referring to FIG. 1, scores may be calculated per document category and/or source type category, for instance and without limitation as determined by a document classifier and/or legal source classifier. In other words, and as a non-limiting example, a first set of scores and/or scoring algorithm may be applicable to a first category of documents, such as appellate briefs, and a second set of scores and/or scoring algorithm may be applicable to a second category of documents, such as legal opinions. Persons skilled in the art, upon reviewing the entirety of this disclosure, will be aware of various additional categories of documents which may have their own scoring algorithms consistently with this disclosure.

Still referring to FIG. 1, in an embodiment, score 124 for one or more of legal source texts 116 may be generated as a function of a second machine-learning process. Second machine-learning process may include any of the machine-learning processes as disclosed in the present disclosure and described below with reference to at least FIG. 4. In an embodiment, score 124 for one or more of legal source texts 116 may be generated using regression analysis. Regression analysis may include any regression analysis technique including those disclosed in the present disclosure.

Still referring to FIG. 1, categorization or grouping of legal source texts 116 may be used for scoring of these legal source texts. Legal source texts 116 may be classified to categories within one or more categorizations, for instance and without limitation using document type classifier. Scores may then be computed within categories, for example and without limitation, score calculations for appellate briefs could be done within just the set of appellate briefs. Categorization, classification and/or scoring of user legal documents 148 may be done in a same or similar fashion as described for legal source texts, as needed or desired.

Continuing to refer to FIG. 1, in an embodiment, score 124 for one or more of legal source texts 116 may be generated as a function of at least an identity of a corresponding legal source 120. For example, and without limitation, legal text from a Supreme Court website may be assigned a higher score compared to legal text from a lower court. In another example, and again without limitation, legal text from one country's official intellectual property website may be assigned a higher score compared to legal text from another country's official intellectual property website. A source type classifier may be used to classify score and/or compare legal source texts from the same source type. For example, and without limitation, legal source texts from court sources may be compared to one another for purposes of scoring, and not with CJS (encyclopedia of United States law at the federal and state levels) entries or restatements. In some cases, authors and/or publishers may also be classified and scored to determine effect on legal source text (or other document) score. Source text classifier may be trained and/or generated in any manner suitable for training and/or generating document type classifier above. In an embodiment, scoring calculation methods for scoring legal documents as described in further detail below may be performed within particular categories of source text to which source text classifier is configured to classify source texts.

With continued reference to FIG. 1, in an embodiment, score 124 for one or more of legal source texts 116 may be generated as a function of at least a value entered by an expert. Expert may include, for example and without limitation, a respected or senior judge, a respected or senior lawyer, a respected or senior law or English professor, a respected or senior legal researcher, and the like, among others. An expert type classifier may be used to classify, score and/or compare different types of experts. For example, expert type classifier may classify a first expert as a judge, a second expert as an academic such as a professor, law student, or the like, a lawyer, a representative of an executive department, a legislator, or the like. Expert type classifier may be trained by training examples correlating identifying information of experts to types of experts as identified by users. Expert type classifier may be trained using any classification algorithm suitable for use in training document type classifier.

In some embodiments, an effect of an expert input on a document score may be weighted by an expert score. An expert score may be generated by rating experts, where rating may be performed, without limitation, by aggregating ratings from peer experts, by polling the legal community, by polling practitioners within an area of practice in which a given expert purports to possess expertise, or the like.

Still referring to FIG. 1, in some embodiments, computing device 104 is configured to train natural language processing model 112 as a function of scored legal source texts 128 and first machine-learning process 132. First machine-learning process 132 may include any of the machine-learning processes as disclosed in the present disclosure and described below with reference to at least FIG. 2, FIG. 3 and FIG. 4. Natural language processing model 112 may include any of the language processing models disclosed in the present disclosure including those described above and described below with reference to at least FIG. 2, FIG. 3 and FIG. 4. These may include, without limitation, neural networks including convolutional neural networks and "feed-forward" networks. Natural language processing model 112 may be trained using a corpus of sourced legal texts. Scored legal source texts 128 may serve as training data 164 which is provided to natural language processing model 112. In some embodiments, computing device 104 may train a plurality of natural language processing model 112 based on various groups of a plurality of scored legal source texts.

Still referring to FIG. 1, in some embodiments, natural language processing model 112 may include a neural network that generates "embeddings" of a vector space which may be a collection of vectors, as described above and in the present disclosure including with reference to at least FIG. 3 and FIG. 4 below. Embedding and/or vectors may be used to find "similar" words, which could be scored according to suitability or efficacy based on legal source texts 116. In other words, there may be another additional machine-learning process in addition to first machine-learning process 132 that also trains natural language processing model 112—one to find word interrelationships based on legal source texts 116, and the other to find appropriate or desirable word choices based on legal source texts 116. Of course, one machine-learning process, such as first machine-learning process 132, may incorporate the features of both processes, as needed or desired. In an embodiment, natural language processing model 112 may be specific to a document category which may be based on one or both of user legal document 148 and/or legal source text 116. This may be referred to as "domain" categorization of NLP models for each domain. For instance, and without limitation, an NLP model may be generated per document type and/or per cluster within document type, for instance by training on a corpus of documents classified to a document type and/or cluster using document type classifier, source type classifier, and/or clustering algorithms as described in this disclosure.

With continued reference to FIG. 1, language processing module 108 may use domain-specific text corpora, such as one or more text corpus based on topic, level of detail, and/or level of technicality. In some embodiments, legal source texts 116 may include groups of legal source texts, such as a first group of legal source texts 116, a second group of legal source texts 116, a third group of legal source texts 116, and the like. The various groups of legal source texts 116 may be distinguished by, for example, their source. For example, legal source texts 116 from legal sources 120 may include high quality legal source texts, low quality legal source texts, and/or non-legal source texts. As used in this disclosure, "high quality legal source texts" are legal source texts that include complex legal issues and/or that are drafted at a high caliber. High quality legal source texts may include legal documents drafted by reputable attorneys and/or law firms. High quality legal source texts may include articles in law school journals written by legal scholars. As used in this disclosure, "low quality legal source texts" are legal source texts that include simple legal issues and/or that are drafted at a mediocre and/or low caliber. Low quality legal source texts may include articles written by law students and/or legal documents that were rejected as improper by a legal authority such as a court, arbitrator, tribunal, and the like. Low quality legal source texts may include legal teaching resources for non-attorneys. Low quality legal source texts may include texts involving legal subject matter from a source other than a legal professional such as a Wikipedia article or news article concerning legal issues. As used in this disclosure, "non-legal source texts" are non-legal documents or excerpts of non-legal documents and/or documents that do not contain legal subject matter. Non-legal source texts may include text from newswire, articles, journals, essays, and/or literature. In some embodiments, legal source texts 116 are confined to a specific language and/or dialect. As a nonlimiting example, legal source texts 116 may all include American English. In other embodiments, legal source texts 116 may all include British English or Anglo-English. Computing device 104 may be configured to access and generate score 124 for each of the high quality legal source texts, low quality legal source texts, and/or non-legal source texts. As described in this disclosure, score 124 may be generated as a function of an identity and/or source of legal source texts 116. For example, score 124 for high quality legal source texts from reputable sources; such as documents submitted to and/or by the U.S. Supreme Court like petitions, responses, and court opinions; may be higher than score 124 for low quality legal source texts from less reputable sources; such as court opinions from small claims courts or Wikipedia articles. In some embodiments, legal source texts 116 are pre-categorized into high quality source legal texts, low quality legal source texts, and/or non-legal source texts. In some embodiments, legal source texts 116 are categorized into high quality source legal texts, low quality legal source texts, and/or non-legal source texts by their source, such as the exemplary sources listed in this disclosure. In some embodiments, the first group of the plurality of scored legal source texts may include high quality legal source texts. In some embodiments, the second group of the plurality of scored legal source texts may include non-legal texts. In some embodiments, a third group of the plurality of scored legal source texts may include low-quality legal source texts.

Figure 6:
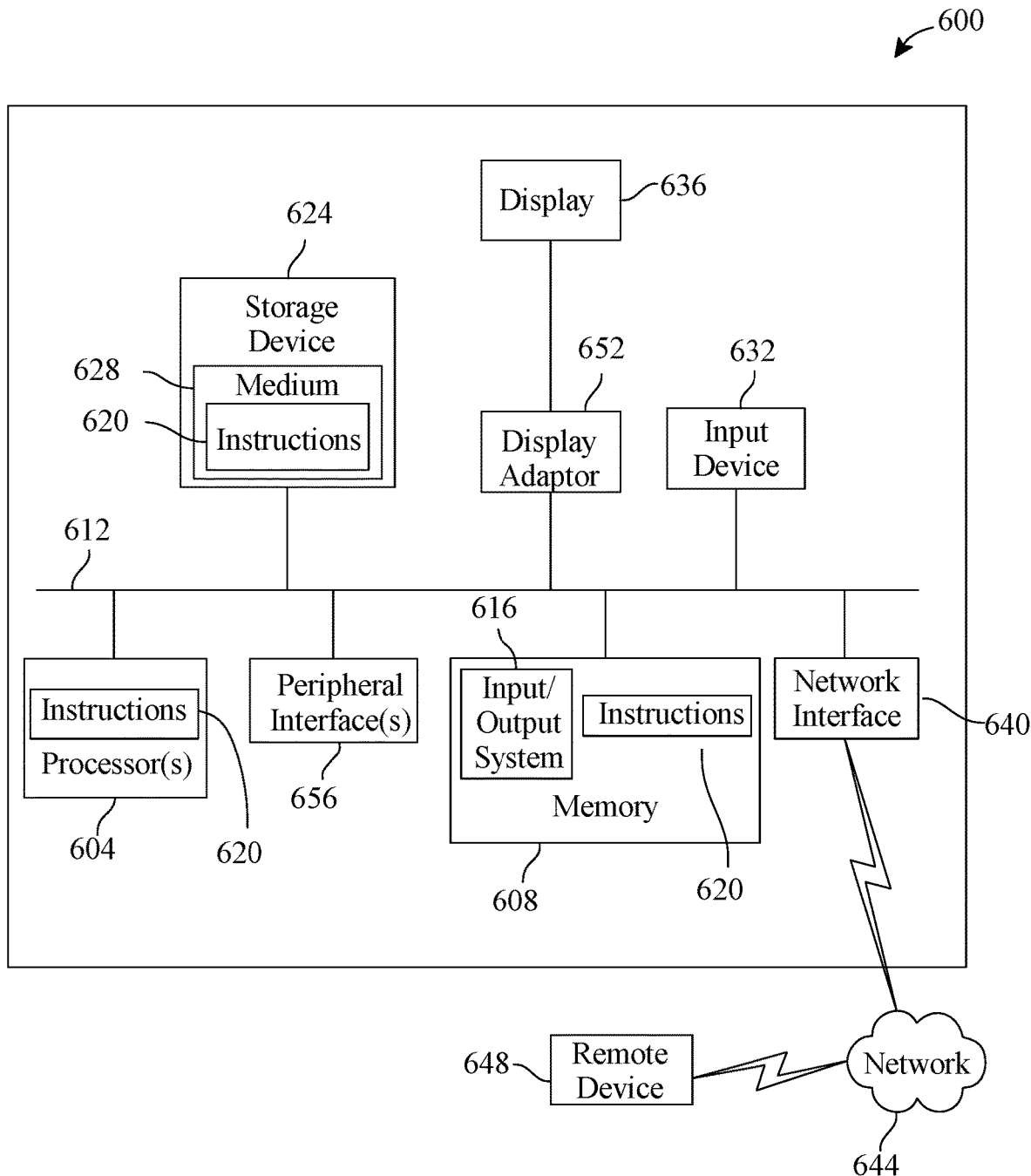
FIG. 6 is a block diagram of a computing system that can be used to implement any one or more of the methodologies disclosed herein and any one or more portions thereof.

With continued reference to FIG. 1, computing device 104 may be configured to identify and determine sequences of words that are frequently occurring in one or more text corpora by generating multiple natural language processing models 112 from distinct resources. In some embodiments, computing device 104 may be configured to train at least a natural language processing model of natural language processing model 112 specific to each group and/or subgroup of scored legal source texts 128. For example, language processing module 108 may operate to produce a plurality of natural language processing models 112 such as a high natural language processing model from high quality legal source texts, a low natural language processing model from low quality legal texts, and/or a general natural language processing model from non-legal texts, as shown in FIG. 6. Language processing module 108 may generate high natural language processing model, low natural language processing model, and/or general natural language processing model by any suitable method described in this disclosure. Computing device 104 may be configured to train high natural language processing model as a function of scored high quality legal source texts of scored legal source legal source texts 128, low natural language processing model as a function of scored low quality legal source texts of scored legal source legal source texts 128, and/or general natural language processing model as a function of scored non-legal source texts of scored legal source legal source texts 128.

Still referring to FIG. 1, computing device 104 may be configured to determine a likelihood of any given combination of words based on statistical properties of n-grams. For example, computing device 104 may determine a probability that two or more consecutive words will be followed by a certain word or words based on a frequency the two or more consecutive words are followed by the certain word in training data natural language processing model 112, such as scored legal source text 128. Computing device 104 may provide the certain word, such as by autofill and/or suggested modification 160, to user when the computing device 104 identifies the two or more consecutive words if the probability is high. In some embodiments, computing device 104 may provide the certain word if computing device 104 determines that the probability of two or more consecutive words in user inputted legal text 136 and/or target text 152 will be followed by a certain word exceeds a threshold probability. In some embodiments, computing device 104 may provide the certain word as user is typing, such as once user types the two or more consecutive words. In some embodiments, computing device 104 may provide the certain word when the word following the consecutive two or more words is not certain word.

Computing device 104 may be configured to detect co-occurrences, outliers, and/or nuances in writing style, such as diction, by comparing models of natural language processing model 112, such as high natural language processing model, low natural language processing model, and/or general natural language processing model. Computing device 104 may analyze user inputted legal text 136 and/or provide suggested modification 160 as a function of detected co-occurrences, outliers, and/or nuances in writing style between high natural language processing model, low natural language processing model, and/or general natural language processing model. In some embodiments, computing device 104 may be configured to analyze user inputted legal text 136, provide suggested modification 160, and/or generate score 156 modified user legal document 168 using plurality of natural language processing models 112 separately, such as high natural language processing model, low natural language processing model, and/or general natural language processing model. For example, computing device 104 may analyze user inputted legal text 136 using high natural language processing model, analyze user inputted legal text 136 using low natural language processing model, and/or analyze user inputted legal text 136 using general natural language processing model. Computing device 104 may be configured to select one of plurality of natural language processing models 112 as a function of the separate analyses. Computing device 104 may select one of plurality of natural language processing models 112 that was trained with legal source texts 116 that closest reflects a writing style, such as diction, of user inputted legal text 136. For example, if user inputted legal text 136 is a formal legal brief for court filing, the writing style will likely be most similar to high quality legal source texts of legal source texts 116 and, thus, computing device 104 may select high natural language processing model of plurality of natural language processing models 112. Computing device 104 may select one of plurality of natural language processing models 112 as a function of the number of suggested modifications 160 that would be outputted using each of plurality of natural language processing models 112. Computing device 104 may select one of plurality of natural language processing models 112 in which computing device 104 would output the fewest number of suggested modifications 160 using that natural language processing model of plurality of natural language processing models 112. Computing device 104 may select one of plurality of natural language processing models 112 as a function of scores 156 of modified user legal documents 168 that computing device 104 would generate if user accepted all suggested modifications 160 that computing device would output using that natural language processing model of plurality of natural language processing models 112. For example, computing device 104 may be configured to analyze user inputted legal text 136 using each of plurality of natural language processing models 112, generate suggested modifications 160 to target text 152 and/or user inputted legal text 136 as a function of each analysis, and/or generate scores 156 of modified user legal document 168 for each analysis with the assumption that user accepts all suggested modifications 160. Computing device 104 may then select one of plurality of natural language processing models 112 based on one or more criteria discussed above and then provide results to user of analysis of user inputted legal text 136 using selected natural language processing model of plurality of natural language processing models 112, such as outputting suggested modification 160 and/or score 156 for modified user legal document 168.

With continued reference to FIG. 1, training natural language processing model 112 may include training an n-gram model. Computing device 104 may train n-gram models using n-gram training data comprising text corpora such as scored legal source texts 128. In some embodiments, computing device 103 may train n-gram models using text corpora from legal sources 120. In some embodiments, computing device 103 may train n-gram models using domain-specific text corpora. Computing device 104 may use language processing module 108 to generate n-gram models.

With continued reference to FIG. 1, computing device 104 may be configured to determine a probability of a string of words from the user-inputted legal text using the n-gram model(s). A "probability," for the purposes of this disclosure, is a measure of the likelihood of an event or occurrence. A probability may be expressed in a variety of manner. A probability may be expressed as odds, e.g. 2 to 1. A probability may be expressed on a scale, wherein the lower limit of the scale indicates a low (or no) probability, and the higher end of the scale indicates a high (or certain) probability. A probability may be expressed as a decimal. A probability may be expressed as a percentage. As a non-limiting example, computing device 104 may use n-gram model to determine the probability that the phrase "binding precedent" would occur in a user-inputted legal text.

With continued reference to FIG. 1, training natural language processing model 112, in some embodiments, may include training a higher-order natural language processing model. Higher-order natural language processing model may use higher-order n-grams. In some embodiments, higher-order natural language processing model may use only higher order n-grams. Further discussion of n-grams may be found through out this disclosure, including with reference to FIG. 1 and FIG. 4. For the purposes of this disclosure, a "higher-order n-gram" is an n-gram of order greater than 1. In some embodiments, the higher order n-grams may be on the order of at least 4-grams. The use of higher-order n-grams may allow for the higher-order natural language processing model to capture more of the context around a given word or letter.

Still referring to FIG. 1, in some embodiments, computing device 104 is configured to receive user inputted legal text 136 from user device 140 being operated by human user 144 to create user legal document 148. User inputted legal text 136 may include any text being entered by a user to create a legal document. User device 140 may include, without limitation, any computing device as disclosed in the present disclosure including a personal computer, laptop, tablet, smartphone, or the like, among others. User 144 may include any person such as, without limitation, a judge, a lawyer, a law practitioner, a paralegal, a legal academic, a law student, and the like, among others. Legal document 148 may include, without limitation, a decision, an opinion, a brief, a motion, a response, and the like, among others.

Still referring to FIG. 1, in some embodiments, computing device 104 is configured to analyze user inputted legal text 136 using natural language processing model 112. Analysis of user inputted legal text 136 may include, without limitation, analysis of sentence structure, including use of active and passive voice, as being created by human user 144. Analysis of user inputted legal text 136, may include, without limitation, similarity of user sentences with those found in scored legal source texts 128. In some cases, a heat map of legal source text and user sentences may be generated. As used in this disclosure, a "heat map" is a representation of data in the form of a map or diagram. For example, and without limitation, data values in a heat map may be represented as colors. A heat map may provide a data visualization technique that shows magnitude of a phenomenon as color in two dimensions. The variation in color may be by hue or intensity, giving visual cues about how the phenomenon is clustered or varies over space. A heat map may be provided to user 144 so as to visualize potential modifications as they relate to user inputted legal text. Alternatively, or additionally, such a heat map may be internally utilized by computing device 104 to facilitate operation of natural processing model 112.

Still referring to FIG. 1, in some embodiments, computing device 104 is configured to suggest, as a function of analysis of user inputted legal text 136 using natural language processing model 112, a modification to target text 152 of user inputted legal text 136. In an embodiment, suggesting modification to target text 152 further includes classifying user legal document 148 into a document type classification, identifying target text 152 of user inputted legal text 136 as a function of the document type classification, and outputting suggested modification 160 to user inputted legal text 136 to user device 140. In some cases, a heat map as mentioned above, may be used to provide suggestions to user 144. In some embodiments, computing device 104 may be configured to generate heat map indicating sentiment detected, such as negative, neutral, or positive, per sentence, paragraph, and/or section of user legal document 148. Computing device 104 may be configured to detect a sentiment of a sentence, paragraph, and/or section of user inputted legal text 136 and/or user legal document 148. For example, computing device 104 may use a machine-learning model trained by a machine-learning process and training data. Training data may include individual words and/or phrases and correlating sentiment. Training data may be manually inputted, for example. For example, training data may include the word "worst" and correlating negative sentiment. Machine-learning model may be configured to output sentiment based on training data and inputted text, such as user inputted legal text 136 and/or user legal document 148. Computing device 104 may be configured to determine an average sentiment for a sentence, paragraph, and/or section of user inputted legal text 136 and/or user legal document 148 based on output from machine-learning model and generate heat map based on the determination.

Still referring to FIG. 1, identification of target texts may be performed using, without limitation, a classifier, which may be trained, without limitation, using user inputs labeling one or more strings of text as pertaining to one or more legal or other purposes; classifier may be trained in any manner suitable for training a classifier as described in this disclosure. Alternatively or additionally, natural language model 112 may be configured to identify target texts, and/or to identify synonyms of user-identified target texts in training examples.

Classifiers and/or NLP models for identification of target texts may be specific to a cohort of similar types of documents to user-entered document, which may be selected, without limitation, using document classifier, legal source classifier, or the like. For instance, target text selection for wills and trusts may be different from target text selection for briefs, patent applications, or the like.

Still referring to FIG. 1, a document type classifier may be used to classify user legal document 148. Any of the classification, categorization and grouping techniques as disclosed in the present disclosure may be used to classify user legal document 148. For example, and without limitation, KNN and Naïve Bayes classifiers, as described above and herein, among other classifiers.

Still referring to FIG. 1, identification of target text 152 (or plurality of target texts 152) may be based on or a function of the document type classification for user legal document 148. Identification of target texts 152 may also be based on or a function of on information gathered within a "cohort" of similar types of documents. For example, and without limitation, there could be different kinds of things to look for as target types within a first document type such as a will than in a second document type such as a Markman brief.

With continued reference to FIG. 1, target identification may initially include tokenization of document; this may precede classification to a document type in some embodiments, using tokenized document. Tokenization may include, without limitation, tokenization based on one or more elements of white space, one or more elements of punctuation, and/or one or more elements identifying phrases, sentences, words, paragraphs, or the like. Score generation may be performed using tokenized document, wherein tokenized elements may be input to scoring algorithm. Identification of target phrases may be performed with regard to tokenized elements.

Still referring to FIG. 1, target text 152 may include any text of user inputted legal text 136 such as a paragraph, part of a paragraph, sentence, part of a sentence, and the like, among others. Based on its analysis, natural language processing model 112 may suggest a modification to target text 152, as needed. This analysis may be based, at least in part, on strength or score 124 of legal source texts 116 in combination with machine-learning rules. In other words, analysis may be a function of scored legal source texts 128 and first machine-learning process 132. Suggested modification 160 to target text 152 may be outputted and/or displayed in a variety of manners on user device 140. For example, and without limitation, suggested modification 160 may be displayed in a text box, window, icon, or the like, among others. User 144 may be alerted to suggested modification 160, for example and without limitation, by an audio alert, vibratory alert, visual alert, or the like, among others. More than one suggested modification 160 may be provides, as needed or desired. Suggested modifications 160 may be ranked and/or other explanatory notes to the suggested modifications may be provided. Target text 152 or text to which suggested modification 160 is directed to may be brought to user's attention by altering its appearance, for example and without limitation, by highlighting, bolding and/or underlining, or the like, among others.

Continuing to refer to FIG. 1, in an embodiment, computing device 104 may be configured to output suggested modification (or modifications) 160 to user device 140 in real-time while human user 144 is creating user legal document 148. In another embodiment, computing device 104 may be configured to output suggested modification (or modifications) 160 to user device 140 once human user 144 has completed creating or modified user legal document 148.

With continued reference to FIG. 1, in an embodiment, computing device 104 may be configured to monitor user's response to suggested modification(s) 160 to target text 152. This user data or information may be saved and used for diagnostic and training purposes, for example, to further refine natural language processing model 112. User data may be based on how user 144 responds with respect to provided or suggestion modification(s) 160 and this information may be captured. For example, and without limitation, user data may include whether or not a suggested modification was implemented by user, whether or not a user ignored a suggested modification, whether user only partially implemented a suggested modification, and the like among others. User 144 may have the ability to completely ignore, completely accept or partially accept suggested modification 160, as desired.

With continued reference to FIG. 1, computing device 104 may be configured to provide a user interface through a plug-in to a word processing program by functioning within the word processing program. User 144 may view user legal document 148 in word processing program and computing device 104 may be configured to analyze user inputted legal text 136 and generate suggested modification 160 for target text 152 as described in this disclosure within the word process program. Computing device 104 may display target text 152 in its original form and suggested modification 160 simultaneously for user 144 to compare and decide whether to accept or reject the suggested modification 160. In some embodiments, computing device 104 may be configured to mark target text 152 to make it easily distinguishable such as with highlight, italics, bold, and the like.

With continued reference to FIG. 1, computing device 104 may be configured to identify at least an instance of passive voice in user legal document 148 and/or target text 152 and generate a suggested modification 160 wherein the suggested modification 160 includes the removal of the at least an instance of passive voice. For example, computing device 104 may be configured to identify the "to be" verb within user legal document 148 and/or target text 152. As used in this disclosure, the "to be" verb is a conjugation of the verb "to be" such as "to be", "am", "is", "are", "be", "being", and "been". Computing device 104 may further be configured to determine that at least a past participle immediately or closely follows "to be" verb and generate suggested modification 160 based on the determination that past particle immediately follows "to be" verb within user legal documents 148 and/or target text 152. For example, computing device 104 may identify "was vandalized" within target text 152 "The house was vandalized by Defendant" and generate suggested modification 160 wherein suggested modification 160 replaces or suggests replacing "The house was vandalized by Defendant" with "Defendant vandalized the house." In some embodiments, computing device 104 may be configured to retrieve one or more stored diction and/or grammatical rules from a database, and the computing device 104 may analyze the user inputted legal text and/or generate suggested modification 160 as a function of the one or more diction and/or grammatical rules. Rules may include logic for detecting when one or more words creates grammatical issues, diction issues, ambiguity, and/or extraneous words. Rules may include correlated suggested modification 160 for each instance of grammatical issues, diction issues, ambiguity, and/or extraneous words. In some embodiments, computing device may be configured to compare any identified use of the verb "to be" with a past participle against a false positive list. If the use is on the false positive list, then the computing device 104 may not generate a suggested modification 160 that addresses this issue. In some embodiments computing device 104 may be configured to identify the usage of "that" within user legal document 148 and/or target text 152. In some embodiments, computing device 104 may be configured to generate a suggested modification 160 wherein the suggested modification 160 includes the removal of the instance of "that." In some embodiments, computing device 104 may be configured to not generate a suggested modification 160 wherein the suggested modification 160 includes the removal of the instance of "that" if the instance of "that" occurs directly after the usage of a preposition. A preposition may include "to," "from," "at," "on," "in," "between," and the like. As a non-limiting example, computing device 104 may be configured to identify "The statute that criminalizes" and generate a suggested modification 160 of "The statute criminalizes."

Still referring to FIG. 1, in some embodiments, computing device 104 is configured to generate score 156 for a modified user legal document 168. Score 156 may include, for example, a numerical value, a range, a ranking, a grade, a categorization, a classification, and the like, among others. In an embodiment, score 156 for completed user legal document 156 may be generated as a function of a third machine-learning process. Third machine-learning process may include any of the machine-learning processes as disclosed in the present disclosure and described below with reference to at least FIG. 4. In an embodiment, score 156 for modified user legal document 168 may be generated using regression analysis. Regression analysis may include any regression analysis technique including those disclosed in the present disclosure. In an embodiment, score 156 may be generated as a function of natural language processing model 112. Any of the classifiers as disclosed in the present disclosure including those described above may be used to perform classification, categorization and/or grouping to generate score 156 and/or suggest modifications 160. In some embodiments, computing device 104 may generate score 124 for legal source texts 116 and/or score 156 for modified user legal document 168 as a function of lexical density of all or part of the legal source texts 116 and/or the modified user legal document 168. As used in this disclosure, "lexical density" is the ratio of unique words to total words. As used in this disclosure, the number of "unique words" in a document is the number of different words in the document. In some embodiments, computing device 104 may generate score 124 for legal source texts 116 and/or score 156 for modified user legal document 168 as a function of the ratio of content words to total words, which differentiates stop words or function words from content words. As used in this disclosure, "content words" are words that possess semantic content and contribute to the meaning of a sentence. As used in this disclosure, "function words" are words whose purpose is more to signify grammatical relationship, rather than contributing to the meaning of the sentence. In some embodiments, computing device 104 may be configured to calculate a number of function words in the modified user document. Ins some embodiments, computing device 104 may be configured to calculate a number of content words in the modified user document. In some embodiments, generating score 156 may include generating a heatmap (or "heat map") as disclosed above regarding score 124. In some embodiments, heat map may include sentiment ratings. Sentient ratings may be consistent with the "sentiment" discussed above regarding score 124. In some embodiments, the heatmap may include sentiment ratings for a plurality of sentences of the modified legal document. In some embodiments, the heatmap may include sentiment ratings on a sentence-by-sentence basis. As a non-limiting example, if a sentence has a sentiment rating of "negative" (or an equivalent), that sentence may be associated with, for example, a blue color. In this case, as another non-limiting example, if a sentence has a sentiment rating of "positive" (or an equivalent), that sentence may be associated with, for example, a red color.

With continued reference to FIG. 1, in an embodiment, score 156 for modified user legal document 156 may be generated as a function of at least a value entered by an expert. Expert may include, for example and without limitation, a respected or senior judge, a respected or senior lawyer, a respected or senior law or English professor, a respected or senior legal researcher, and the like, among others. In an embodiment, computing device 104 may be further configured to train natural language processing model 112 as a function of score 156 of modified user legal document 148. In some embodiments, training data 164 may include score 124 for legal source texts 116 and/or scored legal source texts 128. Additionally, in an embodiment, training data 164 may include score 156 of one or more modified user legal documents 168. Any of the classifiers as disclosed in the present disclosure including those described above may be used to perform classification, categorization and/or grouping to generate score 156 and/or suggest modifications 160. In an embodiment, this may be performed iteratively, with repeated modifications, calculation of updated scores, generation of new suggested modifications, and generation of new updated scores. This process may terminate, without limitation, when the user enters an instruction indicating termination, when the score reaches a preconfigured threshold level, and/or when the score from an iteration differs from a score from one or more previous iterations by less than a threshold amount.

Still referring to FIG. 1, modified user legal document 168 may include a final version which may have been generated after a series of modifications. For example, and without limitation, after each suggested modification is implemented, partially implemented or ignored, an updated score 156 may be generated. Such an iterative scoring process may be continued until user reaches a final version of user legal document and/or modified user legal document 168. Score 156 during iterative process may be referred to as a post-modification score (or rank) until a final post-modification score (or rank) is assigned.

Still referring to FIG. 1, suggested modifications 160 may be ranked and this information presented to user 144. This may, for example and without limitation, allow user 144 to prioritize the sequence of making potential changes or modifications to user legal document 148 and/or pinpoint the most urgent modifications. In some cases, user 144 may also be able to select text which user may be considering modifying to receive feedback on potential modifications. For example, and without limitation, user may point out by highlighting a certain portion of text for which feedback is desired or needed.

Still referring to FIG. 1, computing device 104 may be configured to mine plurality of legal source texts 116 to create an updated legal document with a score higher than individual scores of the mined legal source texts. More than one such updated legal document may be created based on mined legal source texts. Mining or data mining as used herein may be considered to be a process of extracting and discovering patterns in data sets such as, and without limitation, a corpus of legal documents. Similarly, computing device 104 may be further configured to mine user legal documents 156 to create an updated legal document with a score higher than individual scores of the mined user legal documents. More than one such updated legal document may be created based on mined user legal documents.

Still referring to FIG. 1, in some embodiments, data mining may include the following sequence: Computing device may generate scores for individual documents and/or individual target text elements; individual target text elements may be included in legal source documents, user documents, and/or other documents. Where two documents are at a similar or identical score level, computing device may substitute a higher scoring target text and/or target text element from a first document to replace a corresponding lower scoring target text and/or target text element in a second source document to modify that document. Computing device may then calculate or compute a score for the modified document and check if the score has improved or not. These steps may be repeated or iterated until all higher scoring texts and/or higher scoring target text elements corresponding to target text elements in the document to be modified have been imported into modified document importation has shown no improvement to the score. This process may be performed within a document type category or classification. To address issues such as selection of document pairs and which of the documents is to be modified, further classification within a document type may be performed. For example, and without limitation, clustering algorithms such as a particle swarm optimization algorithm and/or k-means clustering algorithms may be used, among others, for further classification. The current document may be matched to a cluster, and then a mining, optimization cycle may be performed within the cluster, which may involve a large-scale genetic algorithm (i.e., pair off documents, do swapping, pick highest scoring documents to swap with each other ("elitism") but also randomly select other documents to swap with each other/elites—this may be kept up until difference in score improvement from one generation of elites to next is below a threshold amount). As a result, this would provide a new highest scoring document within a cluster of interest. This may be done across document types, or across cluster(s) for each cluster. In some cases, top scorers from clusters may compete with each other and/or cross pollination may be used to check if a higher score is achieved.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean, using, for instance behavioral training set as described above. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and order-ing points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of gene combinations with multiple disease states, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device may generate a k-means clustering algorithm receiving unclassified physiological state data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related physiological data, which may be provided with user cohort labels; this may, for instance, generate an initial set of user cohort labels from an initial set of user physiological data of a large number of users, and may also, upon subsequent iterations, identify new clusters to be provided new user cohort labels, to which additional user physiological data may be classified, or to which previously used user physiological data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $argmin_{c_i \ni C}$ dist($c_i$, x)$^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $c_i=1/|S_i|\Sigma x_i \ni S_i^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected physiological data set. Degree of similarity index value may indicate how close a particular combination of genes, negative behaviors and/or negative behavioral propensities is to being classified by k-means algorithm to a particular cluster. K-means clustering algorithm may evaluate the distances of the combination of genes, negative behaviors and/or negative behavioral propensities to the k-number of clusters output by k-means clustering algorithm. Short distances between a set of physiological data and a cluster may indicate a higher degree of similarity between the set of physiological data and a particular cluster. Longer distances between a set of physiological behavior and a cluster may indicate a lower degree of similarity between a physiological data set and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between a physiological data set and the data entry cluster. Alternatively or additionally k-means clustering algorithm may select a plurality of clusters having low degree of similarity index values to physiological data sets, indicative of greater degrees of similarity. Degree of similarity index values may be compared to a threshold number indicating a minimal degree of relatedness suitable for inclusion of a set of physiological data in a cluster, where degree of similarity indices a-n falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure.

Figure 3:
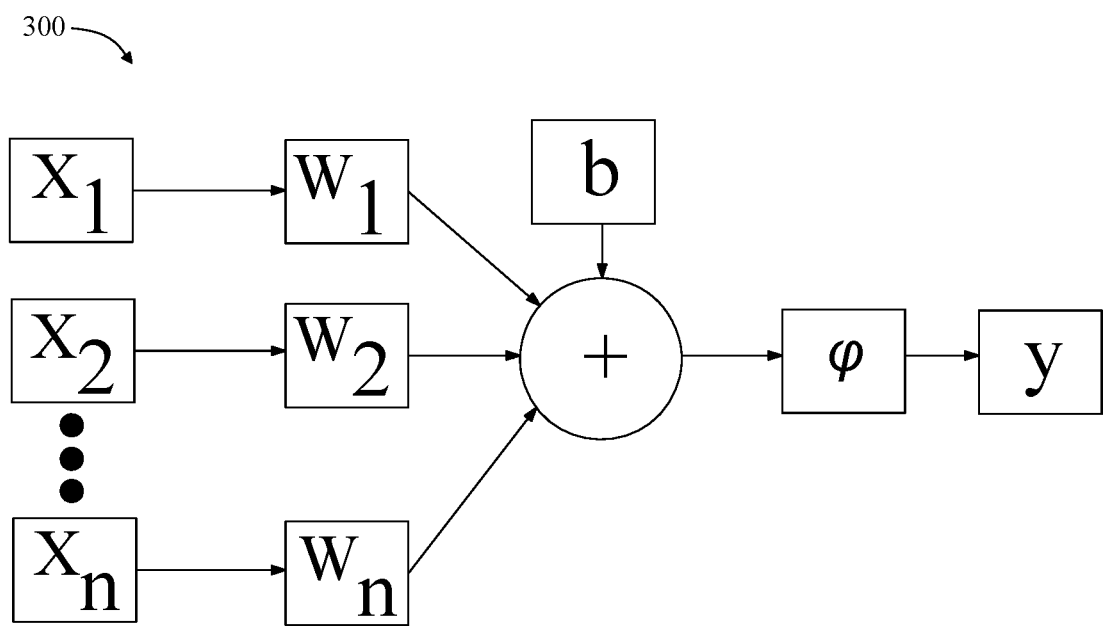
FIG. 3 is a block diagram of an exemplary embodiment of a node of a neural network.
Figure 4:
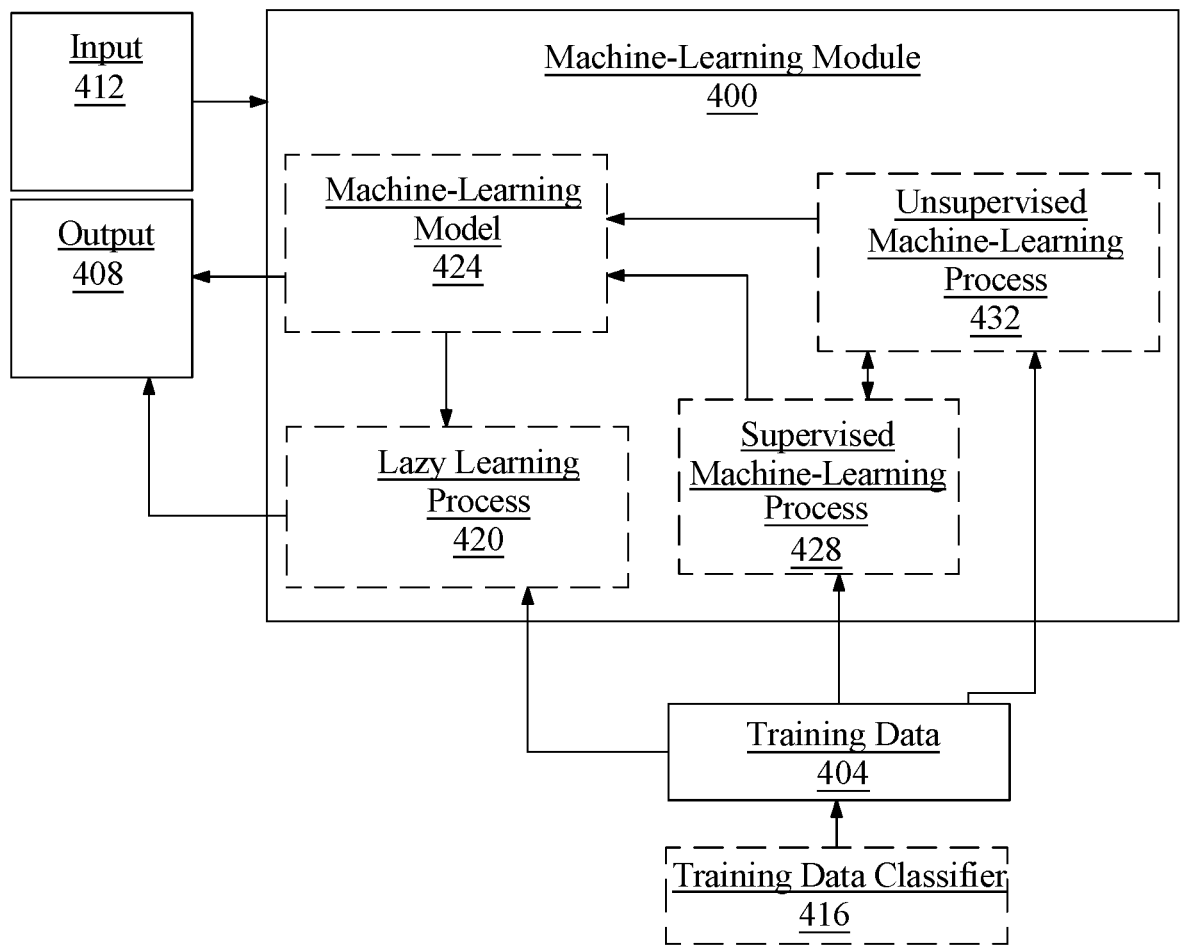
FIG. 4 is a block diagram of an exemplary embodiment of a machine-learning module.

Still referring to FIG. 1, in an embodiment, and additionally or alternatively to the vector space (embeddings) language processing disclosed above and in the present disclosure including at least in reference to FIG. 3 and FIG. 4, computing device 104, language processing module 108 and/or NLP model 112 may be configured to analyze user inputted legal text 136 by utilizing speech tags. Speech tags may be used to identify similar words or groups of words in user inputted legal text 136 and legal source texts 116 (or scored legal source texts 128). Speech tagging or part-of-speech (POS) tagging, sometimes also called grammatical tagging, may be considered to be a process of marking up a word in a text (corpus) as corresponding to a particular part of speech, based on both its definition and its context. POS tagging may be performed using algorithms which associate discrete terms, as well as hidden parts of speech, by a set of descriptive tags.

Still referring to FIG. 1, in modified embodiments, system 100 may be used for intelligent editing (and/or proofreading) of documents other than legal documents. For example, and without limitation, other applications and uses of system 100 may be directed to intelligent editing (and/or proofreading) of college admission applications, employment applications, resumes, and the like, essay competitions, and the like, among others.

With continued reference to FIG. 1, natural language processing model 112 may be used to identify potential target text (or target language) 152. In some embodiments, some of the actions of first machine-learning process 132 and natural language processing model 112 may be described, without limitation, as follows: tokenize user legal document; use tokenized document and document classifier to identify type of document; generate score for this document, for example, based on a scoring algorithm or model for this document type; identify target text and/or target language strings (for example, this may be done using natural language processing model to pick out phrases, figure out similar phrases and/or phrase types, and the like); use natural language model and a selected "high scoring" legal source text of the same or similar document type to find a target text (or language) element from the selected legal source text; combine appropriate language from that selected legal source text with target text (language) to create changed modification (taking into consideration that certain text like names, facts etc. will likely not be the same, but other terminology will likely be); compute an updated (or modified) score for the way user legal document (and/or user inputted legal text) would be if modifications are implemented; iterate the previous acts or step (for example, and without limitation, one way the iteration may be implemented may be by assigning each target text (or language) a score and replacing the one with the worst score, which could be followed in the next iteration by the next worst scoring target text (or language), and so on).

Figure 2:
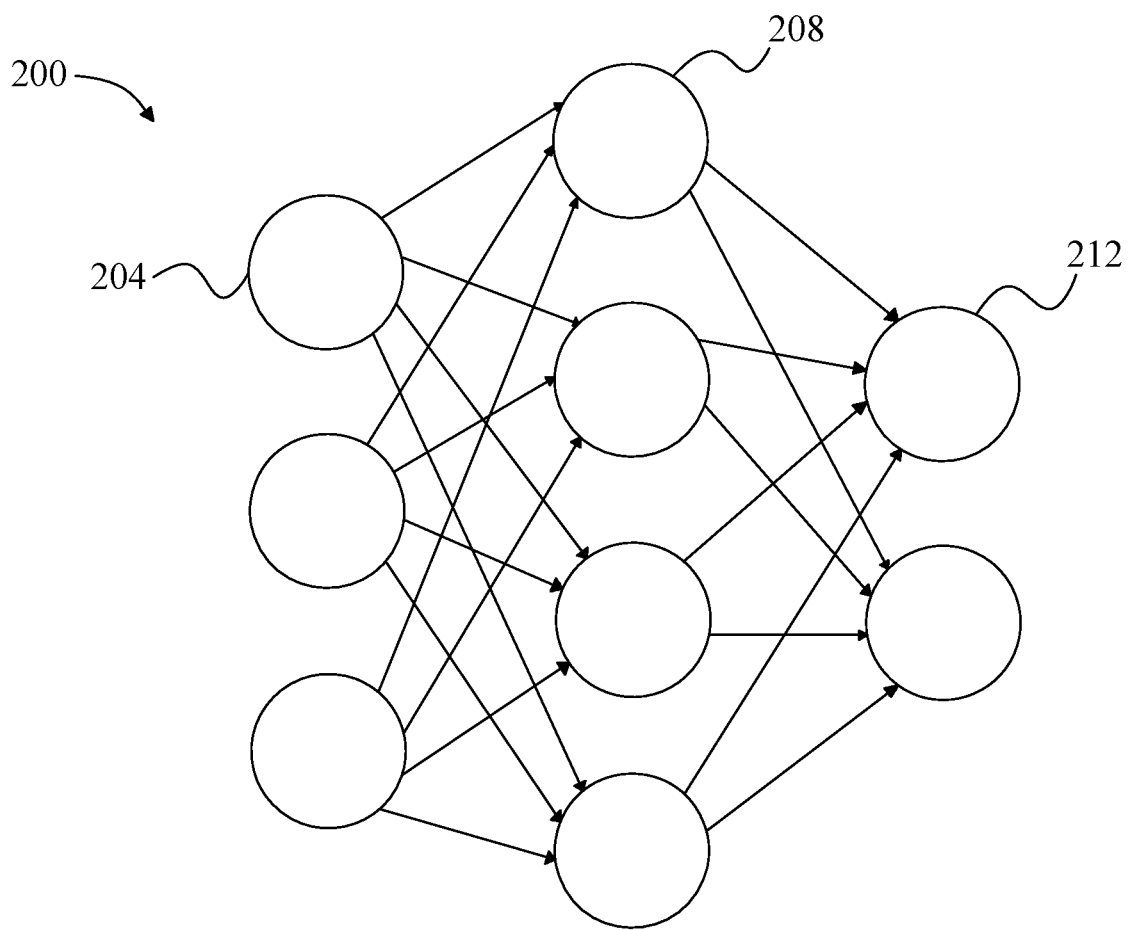
FIG. 2 is a block diagram of an exemplary embodiment of a neural network.

Referring now to FIG. 2, an exemplary embodiment of neural network 200 is illustrated. Any of the language processing models of the present disclosure, including natural language processing model 112 of FIG. 1, may include a neural network such as neural network 200. Neural network 200, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 204, one or more intermediate layers 208, and an output layer of nodes 212. Connections between nodes may be created via the process of "training" the network, in which elements from a training dataset are applied to the input nodes, and a suitable training algorithm (such as Levenberg-Marquardt, conjugate gradient, simulated annealing, or other algorithms) may then be used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network."

Referring now to FIG. 3, an exemplary embodiment of a node 300 of a neural network is illustrated. Neural network my include neural network 200 of FIG. 2. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described herein and above. In some instances, a neural network may receive semantic units as inputs and output vectors representing such semantic units according to weights $w_i$ that are derived using machine-learning processes as described in this disclosure Referring now to FIG. 4, an exemplary embodiment of a machine-learning module 400 that may perform one or more machine-learning processes as described in this disclosure, including natural language processing, is illustrated. Machine-learning module may perform determinations, classification, and/or analysis steps, methods, processes, or the like as described in this disclosure using machine-learning processes. A "machine-learning process," as used in this disclosure, is a process that automatedly uses training data 404 to generate an algorithm that will be performed by a computing device/module to produce outputs 408 given data provided as inputs 412; this is in contrast to a non-machine-learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. In some embodiments, training data 404 may be sorted by higher n-grams to capture more immediate context. In some embodiments, machine-learning algorithms and/or other processes may sort training data 404 into uni-grams, bi-grams, tri-grams, 4-grams, 5-grams, and so on to identify patterns and/or rules that are not readily discernible in lower n-grams. For example, machine-learning module 400 may be configured to revise existing correlations and/or derive new correlations based on training data 404 with high order n-grams. The ability to categorize data entries automatically may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include user inputted legal text 136 (see FIG. 1) and outputs may include suggested modification(s) 160 (see FIG. 1).

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to relate to a particular legal source 120, scores 124 as generated by experts, scores 124 as generated by regression analysis, scores 120 as based on legal source identity, and the like, among others.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include user inputted legal text 136 as described above as inputs, suggested modification(s) 160 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine-learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
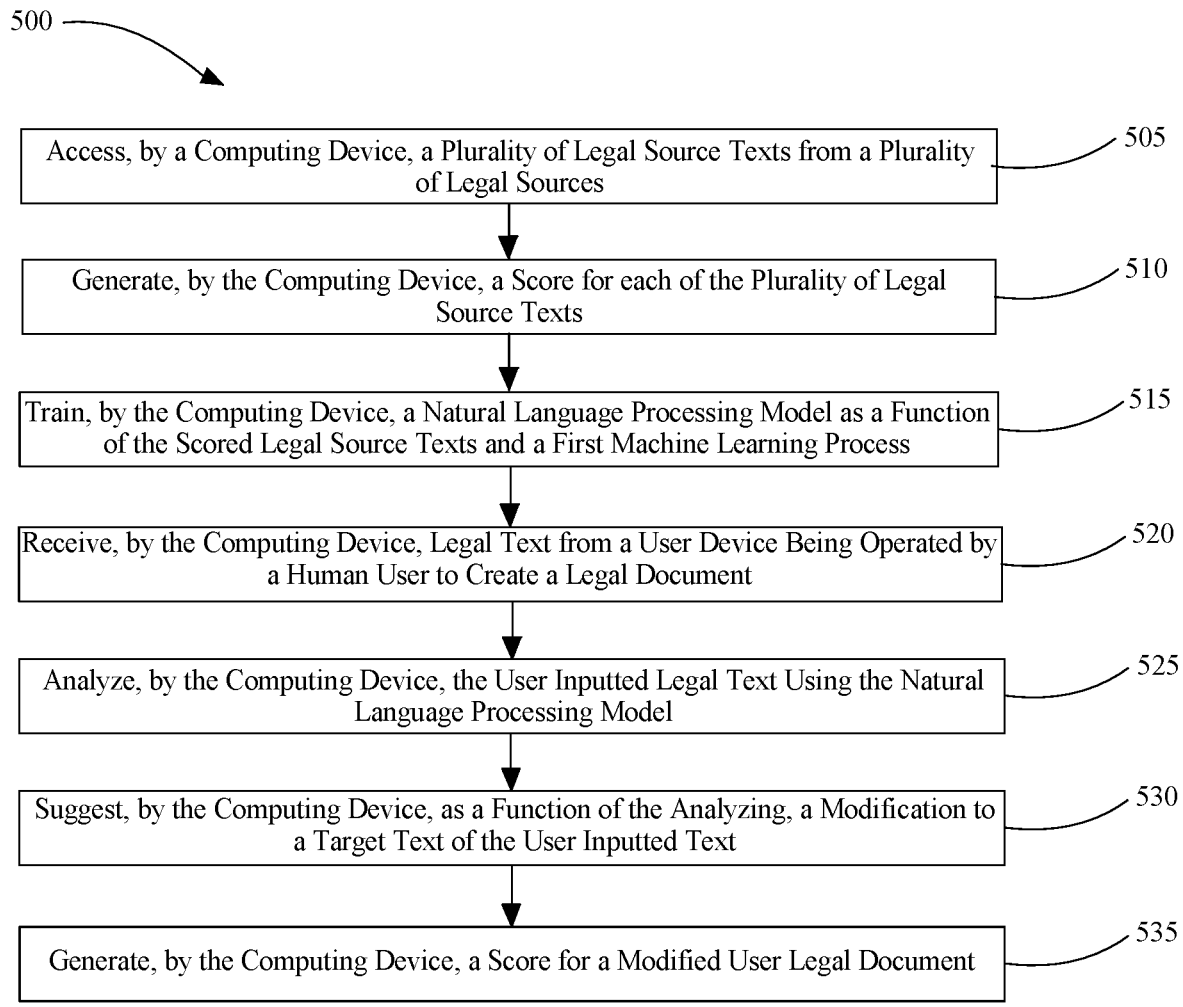
FIG. 5 is a block diagram of an exemplary embodiment of a method for intelligent editing of legal documents.

Now referring to FIG. 5, an exemplary embodiment of a method for intelligent editing of legal documents is illustrated. Intelligent editing may include any of the editing techniques as disclosed in the entirety of the present disclosure including those described above with reference to at least FIG. 1, FIG. 2, FIG. 3 and FIG. 4.

Still referring to FIG. 5, at step 505, a plurality of legal source texts from a plurality of legal sources is accessed by a computing device, such as apparatus including processor and memory communicatively connected to processor, wherein memory contains instructions configuring processor to execute the steps described in this disclosure. Legal source texts may include any of the legal source texts as disclosed herein and described above with reference to at least FIG. 1. Legal sources may include any of the legal sources as disclosed herein and described above with reference to at least FIG. 1. Computing device may include any of the computing devices as disclosed herein and described above with reference to at least FIG. 1 and below with reference to at least FIG. 6. Accessing may include any accessing means as disclosed in the entirety of the present disclosure.

Still referring to FIG. 5, at step 510, a score for each of plurality of legal source texts is generated by computing device. Score may include any of the scores as disclosed herein and described above with reference to at least FIG. 1. Generation may include any generation means as disclosed in the entirety of the present disclosure.

Still referring to FIG. 5, at step 515, a natural language processing model is trained as a function of plurality of scored legal source texts and a first machine-learning process by computing device. Natural language processing model may include any of the natural language processing models as disclosed herein and described above with reference to at least FIG. 1, FIG. 2, FIG. 3 and FIG. 4. In some embodiments, natural language processing model may include plurality of natural language processing models. In some embodiments, a first natural language processing model of plurality of natural language processing models may be trained by first group of plurality of scored legal source texts, and second natural language processing model of plurality of natural language processing models may be trained by second group of plurality of scored legal source texts. Plurality of natural language processing models may include third natural language processing model. Third natural language processing model of plurality of natural language processing models may be trained by third group of plurality of scored legal source texts. In some embodiments, the first group of the plurality of scored legal source texts may include high quality legal source texts. In some embodiments, the second group of the plurality of scored legal source texts may include non-legal texts. Scored legal source texts may include any of the scored legal source texts as disclosed herein and described above with reference to at least FIG. 1. First machine-learning process may include any of the machine-learning processes as disclosed herein and described above with reference to at least FIG. 1, FIG. 2, FIG. 3 and FIG. 4. Training may include any training means as disclosed in the entirety of the present disclosure. Plurality of natural language processing models may include at least an n-gram natural language processing model. In some embodiments, training the plurality of natural language processing models may include training a higher-order natural language processing model of the plurality of natural language processing modules, wherein the higher-order natural language processing model uses higher-order n-grams. This may be implemented as disclosed with reference to FIGS. 1-4. In some embodiments, the higher-order n-grams may be at least 4-grams.

Still referring to FIG. 5, at step 520, user inputted legal text from a user device being operated by a human user to create a user legal document is received by computing device. User inputted legal text may include any of the user inputted legal texts as disclosed herein and described above with reference to at least FIG. 1. User device may include any of the user devices as disclosed herein and described above with reference to at least FIG. 1. User may include any of the users as disclosed herein and described above with reference to at least FIG. 1. User legal document may include any of the user legal documents as disclosed herein and described above with reference to at least FIG. 1. Reception may include any reception means as disclosed in the entirety of the present disclosure.

Still referring to FIG. 5, at step 525, user inputted legal text is analyzed using natural language processing model by computing device. This may be implemented as disclosed, without limitation, with reference to FIGS. 1-4. Analysis may include any analysis means as disclosed in the entirety of the present disclosure. Computing device may be configured to select one natural language processing model of plurality of natural language processing models as function of analyzing and suggest modification to target text of user inputted legal text using selected natural language processing model. In some embodiments, step 525 may include identifying at least instance of passive voice within the user inputted legal text. This may be implemented, without limitation, as disclosed with reference to FIGS. 1-4.

Still referring to FIG. 5, at step 530, a modification to a target text of user inputted legal text is suggested, as a function of analysis, by computing device. Modification may include any of the modifications as disclosed herein and described above with reference to at least FIG. 1. Target text may include any of the target texts as disclosed herein and described above with reference to at least FIG. 1. Suggestion may include any suggestion means as disclosed in the entirety of the present disclosure. Computing device may be configured to generate score for modified user document using selected natural language processing model. Step 530 may include suggesting removal of the at least an instance of passive voice. This may be implemented, without limitation, as disclosed with reference to FIGS. 1-4.

Continuing to refer to FIG. 5, step 530 may include classifying user legal document into a document type classification, identifying target text of user inputted legal text as a function of document type classification, and/or outputting a suggested modification to user inputted legal text to user device. Suggested modification may include any of the suggested modifications as disclosed herein and described above with reference to at least FIG. 1. Document type classification may include any of the document type classifications as disclosed herein and described above with reference to at least FIG. 1. Identification may include any identification means as disclosed in the entirety of the present disclosure. Outputting may include any outputting means as disclosed in the entirety of the present disclosure. Outputting a suggested modification to the user inputted legal text may include displaying target text and suggested modification to target text simultaneously. Classifying may include any classifying means as disclosed in the entirety of the present disclosure.

With continued reference to FIG. 5, method 500 may include an additional step 535. At step 535, a score for a modified user legal document is generated by computing device. Score may include any of the scores as disclosed herein and described above with reference to at least FIG. 1. Modified user legal document may include any of the modified user legal documents as disclosed herein and described above with reference to at least FIG. 1. Generation may include any generation means as disclosed in the entirety of the present disclosure. Computing device may be configured to generate score for legal source text of plurality of legal source texts as function of lexical density of the legal source text. In some embodiments, step 535 may include calculating a number of function words in the modified user legal document. This may be implemented, without limitation, as disclosed with reference to FIGS. 1-4. In some embodiments, step 535 may include calculating a number of content words in the modified user legal document. This may be implemented, without limitation, as disclosed with reference to FIGS. 1-4. In some embodiments, step 535 may include generating the score for the modified user legal document, wherein the score is a ratio of the number of function words to the number of content words. This may be implemented, without limitation, as disclosed with reference to FIGS. 1-4. In some embodiments, step 535 may include generating a heatmap for the modified user legal document, wherein the heatmap comprises sentiment ratings for a plurality of sentences of the modified user legal document. This may be implemented, without limitation, as disclosed with reference to FIGS. 1-4. In some embodiments, the score may include a lexical density score of the modified user legal document. In some embodiments, method 500 may include a further step of receiving a modified user legal document. This may be implemented, without limitation, as disclosed with reference to FIGS. 1-4.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for intelligent editing of legal documents, the apparatus comprising:
   a processor; and
   a memory communicatively connected to the processor, the memory containing instructions configuring the processor to:
   access a plurality of legal source texts from a plurality of legal sources;
   generate a score for each of the plurality of legal source texts;
   train a plurality of natural language processing models as a function of the plurality of scored legal source texts and a first machine-learning process, wherein:
      a first natural language processing model of the plurality of natural language processing models is trained by a first group of the plurality of scored legal source texts; and
      a second natural language processing model of the plurality of natural language processing models is trained by a second group of the plurality of scored legal source texts;
   receive user inputted legal text from a user device being operated by a human user to create a user legal document;
   analyze the user inputted legal text using the plurality of natural language processing models; and
   suggest, as a function of the analyzing, a modification to a target text of the user inputted legal text, wherein suggesting the modification to the target text further comprises outputting a suggested modification to the user inputted legal text to the user device.

2. The apparatus of claim 1, wherein:
   the first group of the plurality of scored legal source texts comprises high quality legal source texts; and
   the second group of the plurality of scored legal source texts comprises non-legal texts.

3. The apparatus of claim 1, wherein:
   analyzing the user inputted legal text using the plurality of natural language processing modules comprises identifying at least instance of passive voice within the user inputted legal text; and
   suggesting a modification to a target text of the user inputted legal text, comprises suggesting removal of the at least an instance of passive voice.

4. The apparatus of claim 1, wherein the memory contains instructions further configuring the processor to train an n-gram model using n-gram training data comprising text corpora.

5. The apparatus of claim 4, wherein the memory contains instructions further configuring the processor to determine a probability of a string of words from the user-inputted legal text using the n-gram model.

6. The apparatus of claim 1, wherein training a plurality of natural language processing models comprises training a higher-order natural language processing model of the plurality of natural language processing modules, wherein the higher-order natural language processing model uses higher-order n-grams.

7. The apparatus of claim 6, wherein the higher-order n-grams are on the order of at least 4-grams.

8. The apparatus of claim 1, wherein the memory contains instructions further configuring the processor to:
   receive a modified user legal document; and
   generate a score for the modified user legal document, wherein generating the score for the modified user legal document comprises:
      calculating a number of function words in the modified user legal document;
      calculating a number of content words in the modified user legal document; and
      generating the score for the modified user legal document, wherein the score is a ratio of the number of function words to the number of content words.

9. The apparatus of claim 1, wherein the memory contains instructions further configuring the processor to:
   receive a modified user legal document; and
   generate a score for the modified user legal document, wherein generating the score for the modified user legal document comprises generating a heatmap for the modified user legal document, wherein the heatmap comprises sentiment ratings for a plurality of sentences of the modified user legal document.

10. The apparatus of claim 1, wherein the memory contains instructions further configuring the processor to:
    receive a modified user legal document; and
    generate a score for the modified user legal document, wherein the score comprises a lexical density score of the modified user legal document.

11. A method for intelligent editing of legal documents, the method comprising:
    accessing, by a processor, a plurality of legal source texts from a plurality of legal sources;
    generating, by the processor, a score for each of the plurality of legal source texts;
    training, by the processor, a plurality of natural language processing models as a function of the plurality of scored legal source texts and a first machine-learning process, wherein:
       a first natural language processing model of the plurality of natural language processing models is trained by a first group of the plurality of scored legal source texts; and
       a second natural language processing model of the plurality of natural language processing models is trained by a second group of the plurality of scored legal source texts;
    receiving, by the processor, user inputted legal text from a user device being operated by a human user to create a user legal document;

analyzing, by the processor, the user inputted legal text using the plurality of natural language processing models; and suggesting, by the processor, as a function of the analyzing, a modification to a target text of the user inputted legal text, wherein suggesting the modification to the target text further comprises outputting a suggested modification to the user inputted legal text to the user device.

12. The method of claim 11, wherein:

the first group of the plurality of scored legal source texts comprises high quality legal source texts; and the second group of the plurality of scored legal source texts comprises non-legal texts.

13. The method of claim 11, wherein:

analyzing the user inputted legal text using the plurality of natural language processing modules comprises identifying at least instance of passive voice within the user inputted legal text; and suggesting a modification to a target text of the user inputted legal text, comprises suggesting removal of the at least an instance of passive voice.

14. The method of claim 11, further comprising training, by the processor, an n-gram model using n-gram training data comprising text corpora.

15. The method of claim 14, further comprising determining, by the processor, a probability of a string of words from the user-inputted legal text using the n-gram model.

16. The method of claim 11, wherein training a plurality of natural language processing models comprises training a higher-order natural language processing model of the plurality of natural language processing modules, wherein the higher-order natural language processing model uses higher-order n-grams.

17. The method of claim 16, wherein the higher-order n-grams are on the order of at least 4-grams.

18. The method of claim 11, further comprising:

receiving, by the processor, a modified user legal document; and generating, by the processor, a score for the modified user legal document, wherein generating the score for the modified user legal document comprises:

calculating a number of function words in the modified user legal document;

calculating a number of content words in the modified user legal document; and generating the score for the modified user legal document, wherein the score is a ratio of the number of function words to the number of content words.

19. The method of claim 11, further comprising:

receiving a modified user legal document; and generating a score for the modified user legal document, wherein generating the score for the modified user legal document comprises generating a heatmap for the modified user legal document, wherein the heatmap comprises sentiment ratings for a plurality of sentences of the modified user legal document.

20. The method of claim 11, further comprising:

receiving a modified user legal document; and generating a score for the modified user legal document, wherein the score comprises a lexical density score of the modified user legal document.

* * * * *